United States Patent [19]
Turner et al.

[11] Patent Number: 5,456,480
[45] Date of Patent: Oct. 10, 1995

[54] FORK SUSPENSION WITH VARIABLE HYDRAULIC DAMPING

[75] Inventors: Paul H. Turner, Boulder; Mike McAndrews, Longmont, both of Colo.

[73] Assignee: Rockshox, Inc., San Jose, Calif.

[21] Appl. No.: 254,755

[22] Filed: Jun. 6, 1994

[51] Int. Cl.$^6$ .................................................... B62K 25/08
[52] U.S. Cl. ............................ 280/276; 188/319; 280/283
[58] Field of Search ...................................... 280/276, 277, 280/279, 283; 267/140.2, 141.1, 141.2, 219, 293, 294; 188/319

[56] References Cited

U.S. PATENT DOCUMENTS

| | | | |
|---|---|---|---|
| 4,971,344 | 11/1990 | Turner | 280/276 |
| 5,044,648 | 9/1991 | Knapp | 280/283 |
| 5,184,703 | 2/1993 | Van Zeggeren | 188/319 |
| 5,186,481 | 2/1993 | Turner | 280/276 |
| 5,195,766 | 3/1993 | Dohrmann et al. | 280/276 |
| 5,269,549 | 12/1993 | Wilson et al. | 280/276 |
| 5,277,283 | 1/1994 | Yamaoka et al. | 188/319 |
| 5,284,352 | 2/1994 | Chen | 280/276 |
| 5,310,203 | 5/1994 | Chen | 280/276 |

FOREIGN PATENT DOCUMENTS

| | | | |
|---|---|---|---|
| 420610 | 4/1991 | European Pat. Off. | 280/276 |

*Primary Examiner*—Mitchell J. Hill
*Attorney, Agent, or Firm*—Sixbey, Friedman, Leedom & Ferguson; David S. Safran

[57] ABSTRACT

Shock absorbing fork, especially a front fork, for a two-wheeled vehicle, particularly a bicycle, of the type having a pair of telescoping struts and a hydraulically damped shock absorbing arrangement disposed within each of the telescoping struts, the shock absorbing arrangement having a piston which divides a hydraulic fluid containing cylinder into upper and lower chambers, a valve regulating flow of hydraulic fluid through the piston between the upper and lower chambers, and a piston rod connected to the piston. Among the improvements of the invention is the provision of a spring for absorbing shocks that acts on the piston of the hydraulic shock damping arrangement upon compression of the telescopic struts, and a location sensitive flow control arrangement having a flow path extending between opposite sides of said piston and a flow adjusting element which is displaceable into and out of said flow path as a function of the extent which the spring is compressed by compression of the telescopic struts. As a result, flow through the flow path is progressively changed as the struts are compressed and the damping characteristics of the hydraulic damping arrangement are progressively varied. Furthermore, a compression damping adjuster shaft having an axially adjustable abutment member thereon to hold the resilient pad against a spring disc of the compression valve of the piston under a holding pressure which is adjustable by axial displacement of the abutment member. Additionally, the entire hydraulically damped shock absorbing arrangement is formed as a self-contained replaceable cartridge unit.

20 Claims, 5 Drawing Sheets

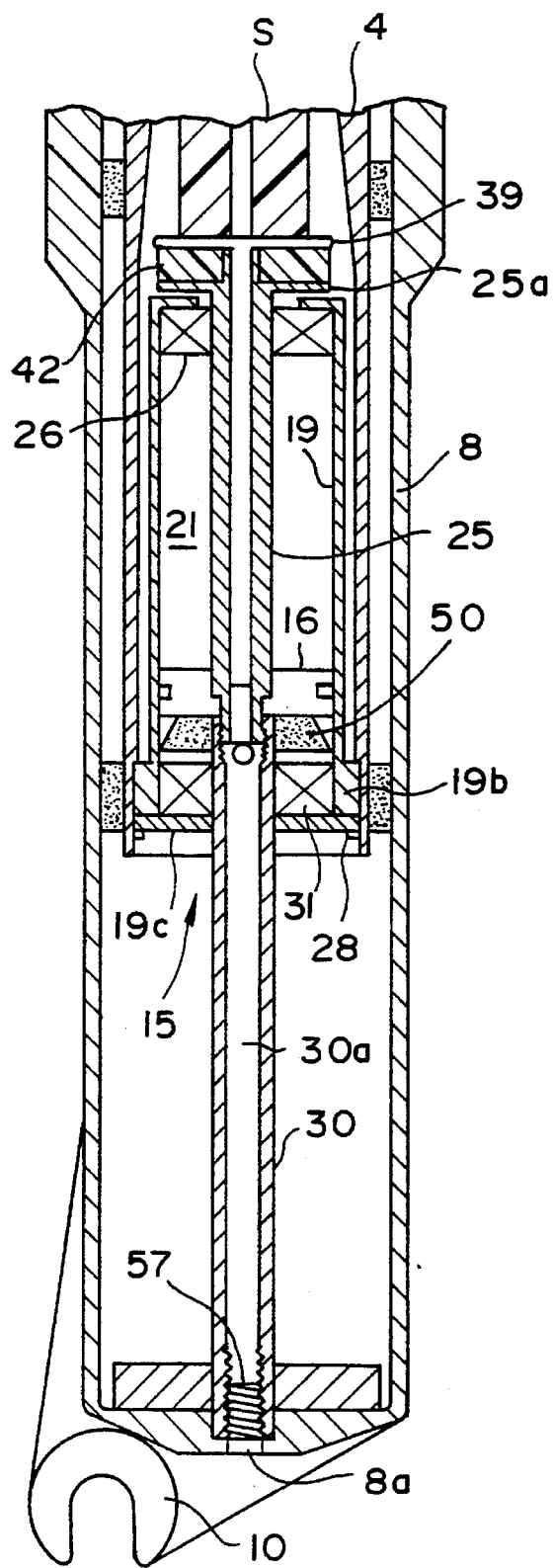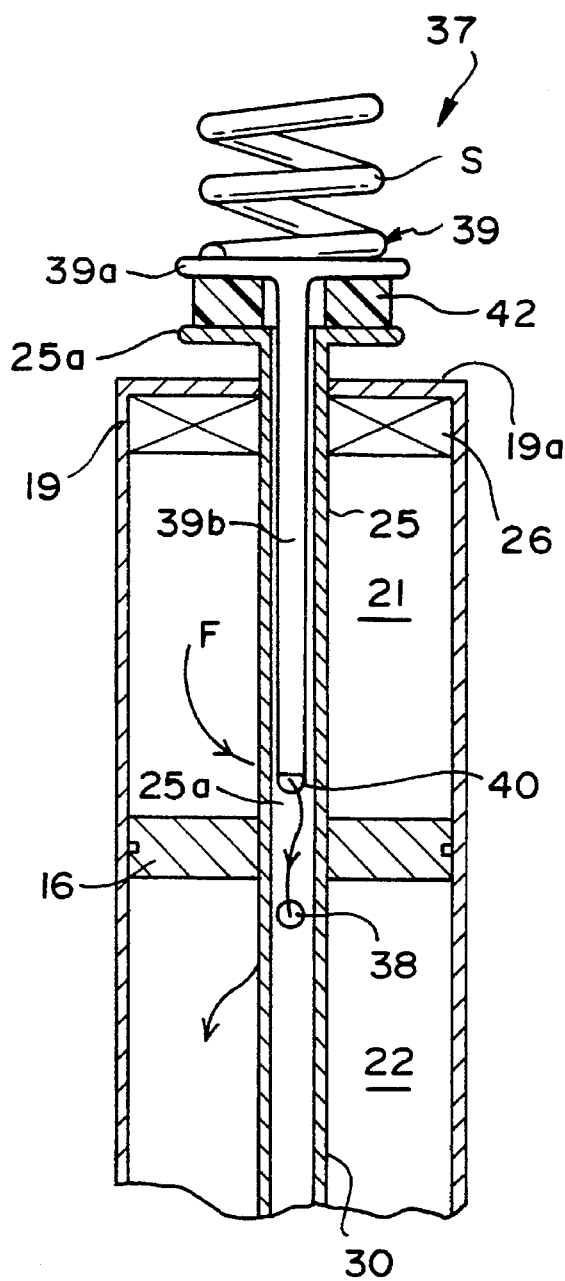
FIG. 2
FIG. 3

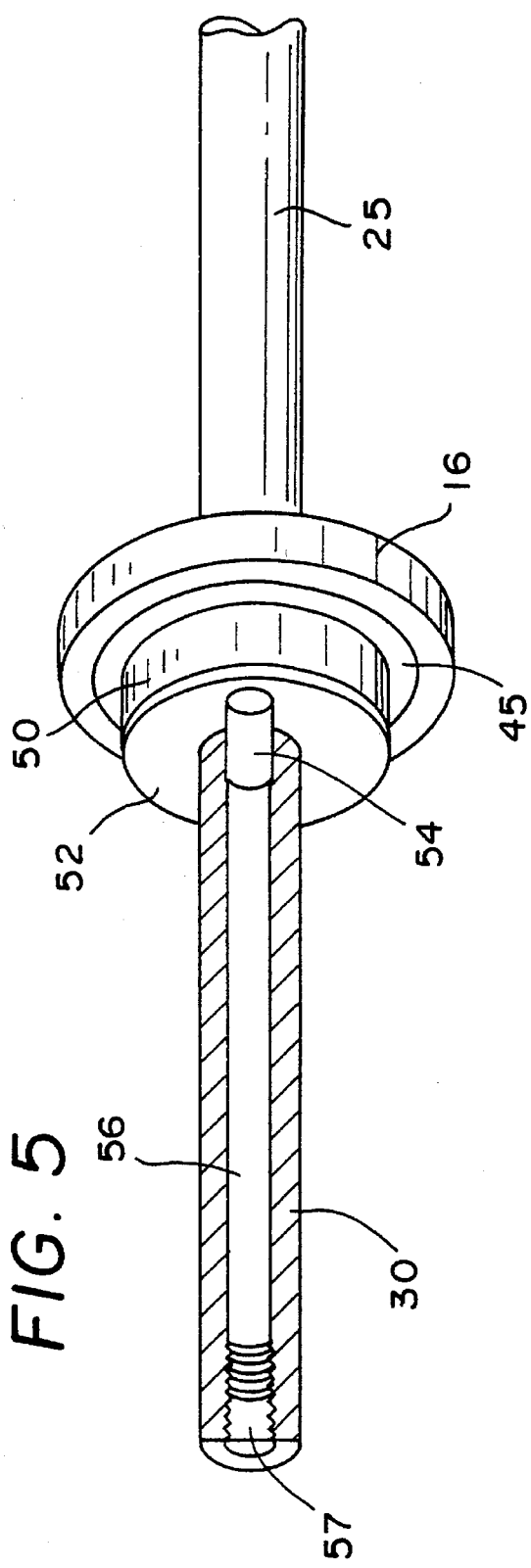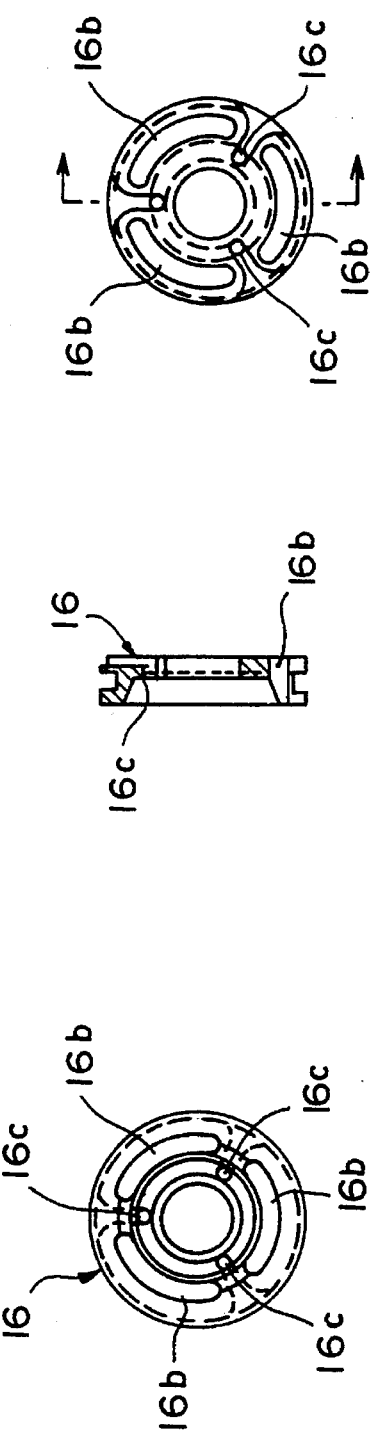

FORK SUSPENSION WITH VARIABLE HYDRAULIC DAMPING

BACKGROUND OF THE INVENTION

1. Field of the Invention

The present invention relates to a shock absorbing system for the front fork of two-wheeled vehicles, especially bicycles. More specifically, the present invention relates to such a shock absorbing system having a hydraulic shock damping unit with variable and adjustable damping characteristics.

2. Description of Related Art

Front fork suspensions have been known for motorcycles for a long time and with the invention of Turner U.S. Pat. No. 4,971,344, became practical for use on bicycles, and have since found widespread use, particularly on mountain bicycles. In the suspension of the Turner patent, air pressure is used to adjust the hydraulic fork to compensate for rider weight variations or to produce a firmer or softer ride. However, because the extension damping performance of the suspension is directly related to the amount of air pressure in the system, adjusting of the air pressure to compensate for a rider's weight could adversely affect the extension damping characteristics of the suspension, and no other means existed to vary the performance characteristics of the suspension, nor was the suspension designed to produce differing performance characteristics under different loading conditions apart from an ability to "lockout" low level forces of the type produced by pedaling while allowing the fork to react to high impact forces.

In Turner U.S. Pat. No. 5,186,481, the fork suspension of the above-mentioned Turner patent was improved to enable varying of the preload on a coil-type compression spring, that acts to hold a compression valve plate of a metering valve located between upper and lower hydraulic chambers in a closed position until a predetermined force level is reached at which time it pops open to allow flow through the valve. In particular, by turning of an adjustment rod so as to screw it more or less into the metering valve, the coil-type compression spring is caused to contract or expand, thereby changing the force required to open the compression metering valve, and allowing a wide range of adjustments for adapting the suspension to widely differing circumstances of rider weight and riding experience. However, this adjustability does not affect the suspension beyond setting the threshold level at which compression of the fork will commence.

Other shock absorbing bicycle forks have since been developed which allow for personalized adjustment of the performance characteristics of the fork. For example, Wilson et al. Pat. No. 5,269,549, discloses a suspension for the front wheel of bicycles in which a spring action is used for shock absorbing purposes and is obtained by a skewered arrangement of stacked elastomeric pads which are disposed between the ends of the fork strut tubes to absorb shocks by deformation thereof. By using different combinations of pads of different durometers, resilience characteristics and/or lengths, the shock absorbing characteristics can be changed in accordance with the rider's weight and the conditions under which the bicycle will be ridden. However, such an arrangement necessitates maintaining a large number of pads and trial and error attempts to achieve the proper performance characteristics taking into consideration the rider's weight, assuming such can be achieved given the combinations of available different pads. Also, an elastomeric suspension simply is incapable of achieving the same kind of ride as a hydraulic suspension in that spring shock absorbing characteristics are a function of the distance they are compressed while a hydraulic suspension has a damping characteristic that is a function of the speed at which the shock absorber is compressed.

Chen U.S. Pat. No. 5,284,352 discloses a compression-adjustable bicycle shock absorbing front fork which, like that of Wilson et al., utilizes a skewered arrangement of interchangeable stacked elastomeric pads, and to which a compression coil spring is added. In addition to the adjustability afforded by the ability to change elastomeric pads, the initial compression characteristics and the travel length which the strut can be compressed can be adjusted by rotating of a mounting member which acts to reduce or expand the initial height of the stacked pads and spring. While an improvement over the Wilson et al. suspension in that adjustments can be made without replacing one or more elastomeric pads with others, it still lacks the damping characteristics of a hydraulic suspension.

Of course, hydraulic shock absorbers with variable damping characteristics are well known in the automotive and motorcycle field. Examples of such variable damping hydraulic shock absorbers can be found in Van Zeggeren U.S. Pat. No. 5,184,703 and in Yamaoka et at. U.S. Pat. No. 5,277,283. In both of these examples, a plurality of flow orifices are provided to provide a plurality of possible flow paths of differing damping characteristics with means being provided to change the orifices/flow paths for the hydraulic damping fluid to vary the damping characteristics. In the case of the Van Zeggeren patent, the variation in damping characteristic is produced electronically, and can be locked into one of two positions, i.e., a "sport" setting having a high damping action and a normal setting providing a softer ride due to a low damping action, or damping can be adjusted in response to various driving condition sensors, such as accelerometers, gradient detectors, etc. Such a suspension is clearly impractical for use on bicycles, even without regard to the fact that motor vehicular suspensions are designed for different purposes than those for bicycle, such as achieving a soft ride while handling vehicular momentum.

The Yamaoka et al. patent seeks to provide stability and comfort during any automotive vehicular driving condition by linearly varying the damping characteristics or damping force of their shock absorber as a function of piston stroke. This result is achieved utilizing a tandem arrangement of orifices having different flow restriction variation characteristics, so that the damping characteristics will vary as a function of piston speed. However, such a motor vehicular suspension also is not designed for bicycle riding conditions, on the one hand, being too costly a construction to be commercially feasible to use on a bicycle, and on the other hand, not providing optimum response characteristics for a bicycle which will be ridden under off-road conditions as well as on and which should not bounce around simply due to pedalling, especially that type of pedalling known as "jamming", not to mention the need for the suspension to be personalized to the rider's weight and riding style.

Thus, there is still a need for a shock absorbing system having a hydraulic shock damping unit with variable and adjustable damping characteristics that will allow a wide range of adjustments for adapting the suspension to widely differing circumstances of rider weight and riding experience, yet, at the same time being practical and economic for use on bicycles by the average rider thereof.

SUMMARY OF THE INVENTION

It is a primary object of the present invention to provide a front fork for two-wheeled vehicles, particularly bicycles, which has a shock absorbing system having a hydraulic shock damping unit with variable and adjustable damping characteristics that will allow a wide range of adjustments for adapting the suspension to widely differing circumstances of rider weight and riding experience.

In conjunction with the preceding object, another object of the invention is to provide a hydraulic shock damping unit in which the compression force characteristic of a piston flow control valve having a leaf spring type valve plate can be effectively adjusted.

Also in fulfillment of the primary object, a further object of the invention is to provide a hydraulic shock damping unit in which the damping characteristic can be made sensitive to the position of the hydraulic piston so that damping is increased as the shock absorber is compressed.

Yet another object of the present invention is to obtain the preceding object in a manner which is keyed to a shock absorbing spring unit of the fork, so that changes in spring rate automatically produce corresponding changes in the location sensitivity of the hydraulic unit of the fork.

Still another object is to provide a hydraulic shock damping unit which can be preassembled, and then installed and replaced within the fork as a unit.

A further object of the present invention is to obtain the foregoing objects in a manner that is practical and economic for use on bicycles and is adjustable and serviceable by the average bicycle rider.

These and other objects of the invention are obtained in accordance with preferred embodiments of the invention in a shock absorbing front fork for a two-wheeled vehicle, particularly a bicycle, of the type having a pair of telescoping struts, upper tubes of which are interconnected by an upper crown to a steerer tube at an upper end portion thereof and lower tubes of which have means for mounting a wheel axle at a bottom end thereof, and a hydraulically damped shock absorbing arrangement disposed within each of the telescoping struts, said shock absorbing arrangement having a piston which divides a hydraulic fluid containing cylinder into upper and lower chambers, a valve for regulating flow of hydraulic fluid through said piston between the upper and lower chambers, and a piston rod connected to said piston, said piston rod acting on said piston in a first direction upon compression of the telescopic struts. Among the improvements of the invention is the provision of a spring means for absorbing shocks that acts on the piston of the hydraulic shock damping arrangement upon compression of the telescopic struts, and a location sensitive flow control arrangement having a flow path extending between opposite sides of said piston and a flow adjusting element which is displaceable into and out of said flow path. The spring means acts on the flow adjusting arrangement to shift it into said flow path by a distance that is a function of an extent to which said spring means is acted upon in said first direction by compression of the telescopic struts. As a result, flow through the flow path is progressively restricted as the struts are compressed and the damping characteristics of the hydraulic damping arrangement are progressively increased.

A further improvement is achieved in that the valve comprises at least one leaf spring disc mounted on an opposite side of the piston from the piston rod and overlying a plurality of passages through said piston. The total flow-through area of the passages is increased as the spring disc is deflected away from the piston, commencing at a peripheral edge of the spring disc, due to pressure increases in said upper chamber due to compression of the struts but such deflection is controlled by an annular resilient pad that is disposed overlying said spring disc. A compression damping adjuster shaft having an axially adjustable abutment member thereon is mounted on the opposite side of the piston from the piston rod and this abutment member holds the resilient pad against the spring disc under a holding pressure which is adjustable by axial displacement of the abutment member.

Another improved feature of the invention is that the hydraulically damped shock absorbing arrangement is formed as a self-contained replaceable cartridge unit detachably mounted within each strut. The cartridge unit comprising a cartridge body which encloses the piston and defines the upper and lower hydraulic fluid chambers in conjunction with the piston, the piston rod sealingly extending through an end wall of the cartridge body.

These and further objects, features and advantages of the present invention will become apparent from the following description when taken in connection with the accompanying drawings which, for purposes of illustration only, show several embodiments in accordance with the present invention.

Brief DESCRIPTION OF THE DRAWINGS

FIG. 2 is a vertical cross-sectional view of a portion of one strut of the FIG. 1 fork;

FIGS. 3 is an enlarged diagrammatic depiction of a location damping arrangement of the variable hydraulic damping system of the present invention;

FIG. 5 is a perspective illustration of the compression damping adjuster of the compression damping arrangement of FIG. 4;

FIGS. 6–8 are top plan, vertical cross-sectional and bottom plan views of the piston of the compression damping arrangement of FIG. 4.

DETAILED DESCRIPTION OF THE PREFERRED EMBODIMENTS

Figure 1:
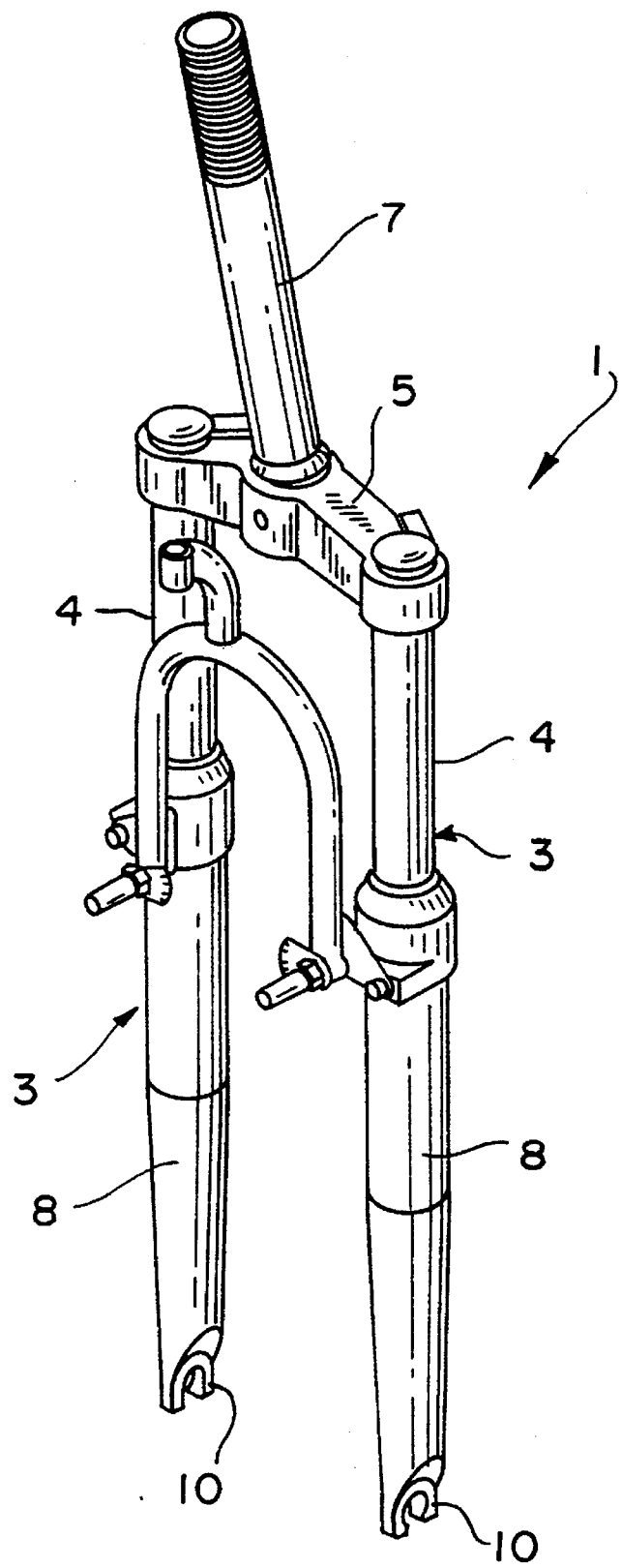
FIG. 1 a perspective view of a front fork for a bicycle incorporating the variable hydraulic damping system of the present invention.

FIG. 1 shows a shock absorbing front fork 1 for a bicycle of the type having a pair of telescoping struts 3, upper tubes 4 of which are interconnected by an upper crown 5 to a steerer tube 7 at their upper ends. The lower tubes 8 of struts 3 telescopingly receive the upper tubes 4 in the upper end thereof, and have mounting brackets 10 to which an axle of a front wheel (not shown) is attached at the bottom end the struts.

A hydraulically damped shock absorbing arrangement 15 is disposed within at least one of the telescoping struts 3, it having been found to be sufficient (and acceptable from a fork flexing standpoint) to provide compression damping in only one strut 3 of fork 1, it also being possible to provide the same or a different type of hydraulic damping, or no hydraulic damping, at all in the other strut 3. Hydraulically damped shock absorbing arrangement 15 includes a piston 16 which divides a hydraulic fluid containing cylinder (formed in this case by the body 19 of a replaceable cartridge unit 20 that is described in detail below) into an upper chamber 21 and lower chamber 22. A valve 24 shown in enlarged scale in FIG. 4 but omitted from FIGS. 2&3 for illustrational simplicity is provided for regulating a flow of hydraulic fluid through the piston 16 between the upper and lower chambers 21, 22, and a piston rod 25 is connected to the piston 16 and acts on piston 16 upon compression of the telescopic struts, Piston rod 25 passes through the top end wall 19*a* of the cartridge body 19, a seal 26 being provided thereat to prevent leakage. The cartridge body is retained in the open lower end portion of the upper tube 4 by any suitable means, such as by being provided with an enlarged end portion 19*b* which is received in an annular recess in the peripheral wall of the upper tube 4 and is held therein by C-shaped, spring retainer clip 28 (FIG. 2) which engages in an annular groove at the lower end of the annular recess in the peripheral wall of the upper tube 4. A rod 30 extends from the opposite side of piston 16 from piston rod 25, passes through a seal 31 and the lower end wall 19*c* of the cartridge body 19. The end of this rod 30 is fixed, such as by a screw, to the bottom end of the lower tube 8. Thus, relative movement between the upper and lower tubes 4, 8, produces relative movement between the piston 16 and cartridge body 19 with rod 30 moving into the cartridge body 19 and the piston rod 25 moving out of the cartridge body 19 during compression and the reverse occuring during extension, FIG. 2 showing the relationship thereof in a fully extended state with piston 16 at the bottom of cartridge body 19.

For absorbing shocks, a spring means S acts between a flange 25*a*, (FIGS. 2 & 3) provided on the outer, upper end of the piston rod 25, and the upper tube 4 of each strut 3. The spring means can comprise one or more rubber or elastomeric bumpers, as represented in FIG. 2, a coil spring, as represented in FIG. 3, a leaf spring (not shown) or any other suitable compression spring arrangement. As the strut 3 is compressed, e.g., due to impacting of the front wheel on a rock or in a rut, the upper tube 4 moves into the lower tube 8 compressing the spring means S between its upper end and piston flange rod 25*a*.

As the spring means S is compressed impact energy is absorbed and the force which it exerts on the flange 25*a* of the piston rod 25 increases. This increasing spring force is utilized, according to one feature of the present invention, to operate the location sensitive flow control arrangement 37 represented in FIG. 3. The location sensitive flow control arrangement 37 has a flow path (arrow F) extending between upper fluid-filled chamber 21, on one side of piston 16 and the lower fluid-filled chamber 22 on the opposite side thereof. This flow path passes through a compression flow inlet port 40 which communicates the upper chamber 21 with an axial passage 25*a* in the piston rod, which connects with an axial passage 30*a* in the second rod 30, the axial passage 30*a* having a compression flow outlet port 38 which communicates the flow from the passage 30*a* with the lower chamber 22.

A flow adjusting element 39 comprises a flange-like displacement portion 39*a*, which is engaged by the spring means S, and a flow adjusting shaft 39*b* which is displaceable into and out of the flow path F so as to progressively block and unblock compression inlet port 40, FIG. 3 showing port 40 being partially blocked and FIG. 2 showing it fully blocked. A resilient means formed, for example, by an annular elastomeric pad 42 is located between the displacement portion 39*a* of flow adjusting element 39 and the end 16*a* of the piston rod 16. Thus, upon compression of the struts 3, the increasing force of the spring means S, via displacement portion 39*a*, compresses pad 42 so as to shift the flow adjusting shaft 39*b* into flow path F by a distance that is a direct function of an extent to which said spring means has been compressed and so that flow through the flow path is progressively restricted as said struts are compressed and the damping characteristics of the hydraulic damping arrangement are progressively increased. Upon extension of the struts 3, the resiliency of the elastomeric pad 42 raises the shaft 39*b*, reopening the flow path F.

As can be appreciated, not only does the location sensitive flow control arrangement 37 provide a displacement sensitivity to the inherently speed sensitive hydraulic damping arrangement, but it does so in a way that is linked to the spring rate of the shock absorbing spring S. Thus, any changes to the spring rate, produced by, e.g., exchanging a stiffer or softer spring means S for the existing one, or by expanding or contracting the spring means S via an adjustment mechanism, simultaneously brings about a corresponding increase or decrease in the damping characteristics of the hydraulic damping arrangement.

With reference to FIGS. 4–8, compression damping adjustment feature of the present invention will now be described. Valve 24 comprises at least one shim-type, annular leaf spring disc 45 mounted on the lower side of the piston 16 and a rebound washer 46 on the opposite side of the piston 16. Advantageously, a very simple and effective means for holding this entire valve assembly together has been achieved by a screw thread connection 47 between the inner ends of rods 25, 30, clamping the piston 16 and the inner periphery of spring disc(s) 45 between them. The spring disc(s) 45 overly a plurality of passages 16*b* through the piston 16 and passages 16*c* are controlled by rebound washer 46 (FIGS. 6–8). As is known for damping valves of this general type, the total flow-through area of the passages through piston 16 progressively increase as the spring disc(s) deflect away from the piston, commencing at a peripheral edge of the spring disc, due to pressure increases in upper chamber 21 caused by compression of the struts.

Figure 9:
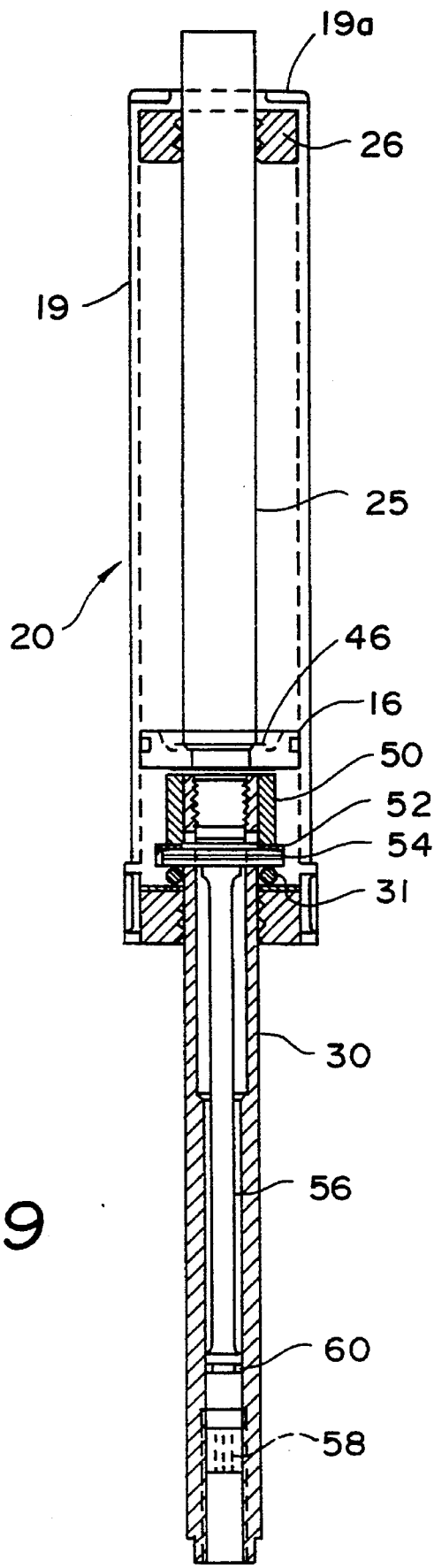
FIG. 9 is a partial cross-sectional view of a damping unit incorporating the location damping arrangement of FIG. 3 and the compression damping arrangement of FIG. 4.

However, departing frown conventional practice, an annular resilient pad 50 is disposed overlying the spring disc(s) 45. Pad 50 is held against the spring disc(s) 45 by an axially adjustable abutment member in the form of an annular holding disc 52 carried by the rod 30, when rods 25 and 30 are screwed together. The holding pressure exerted by annular holding disc 52 pressing the resilient pad 50 against the spring disc(s) 45 is adjustable by axial displacement of annular holding disc 52. For this purpose, a cross pin 54 extends through an axially elongated, diametral slot 30*b* extending through the rod 30, the rod 30 is formed as a hollow shaft having an axial passage 30*c* in which an adjustment rod 56 is in an axially adjustable manner, such as by the screw thread connection 57 shown in FIGS. 2 & 5, the lower end of adjustment rod 56 being provided, for example, with an Allen wrench socket 58 (FIG. 9) which is accessible through an opening 8*a* at the bottom of lower tube 8 (FIG. 2). Adjustment rod 56 engages the cross pin 54, so that by axial adjustment of the position of the adjustment rod 56 within the hollow shaft of rod 30, the position of the cross pin 54 is axially shifted along the length of the rod 30 in the elongated diametral slot 30*b* to thereby cause the holding disc 52 to compress the annular resilient pad to a greater or lesser extent.

Figure 4:
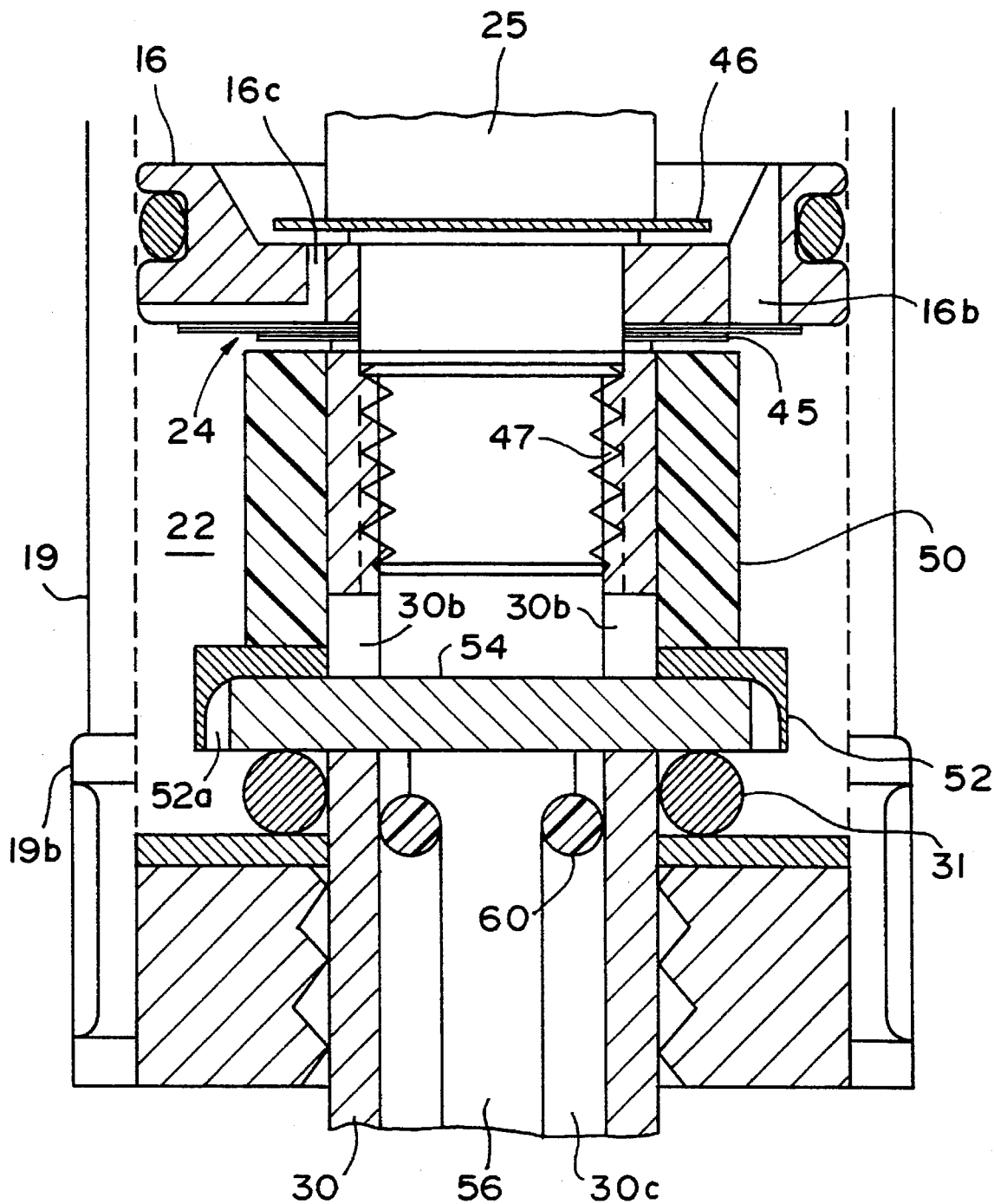
FIG. 4 is an enlarged cross-sectional view depicting a compression damping arrangement of the variable hydraulic damping system of the present invention.

While the cross pin 54 may merely abut on the surface of a holding disc 52 that is washer-shaped (as shown in FIG. 5), preferably, the annular holding disc 52 has a diametrally running receiving groove 52a in which cross pin 54 is received as shown in FIG. 4. In this way, no additional measures need be taken to avoid the dislodgement of the cross pin from slot 30b of rod 30. Still further, the cross pin 52, can serve to hold itself to the holding disc by being made of a rolled piece of spring steel sheet whose diameter is compressed when the cross pin 52 is forced into the receiving groove 52a, such a form for the cross pin being represented in FIG. 9. Lastly, to prevent leakage through passage 30 along the adjustment rod 56, while permitting slot 30b to serve as the compression outlet port 38, an O-ring seal 60 can be provided around the adjustment rod 56 as represented in FIGS. 4 and/or 9.

As mentioned above, and as shown in FIG. 9, in accordance with another feature of the present invention, the hydraulically damped shock absorbing arrangement is formed as a self-contained replaceable cartridge unit 20. This cartridge unit 20 comprises a cartridge body 19 which encloses piston 16 and defines the upper and lower chambers 21, 22 in conjunction with piston 16 which sealingly extends through the top end wall of the cartridge body, and with the rod 30 sealingly extending through the opposite, lower end wall of the cartridge body 19. The use of cartridge unit 20, instead of the conventional practice of using the tubes of the strut to define the hydraulic cylinder, advantages are achieved from both a manufacturing standpoint and a especially from servicing standpoint. For example, from a manufacturing and assembly stand point no special steps need be taken to separate the spring structure from the hydraulic damping structure, no strut need to be designed with regard to the need to fill the hydraulic cylinder of the damping unit. Furthermore, servicing is made very user friendly in that, should, with extended use, the fluid seals wear and leakage of hydraulic fluid from the cylinder result, the user can simply, cleanly and easily remove the entire cartridge unit 20 and replace it with a new one, instead of undergoing the troublesome and messy process of draining the fork, replacing the seals and refilling it, or having to pay a bicycle technician to do it for him or her.

While various embodiments in accordance with the present invention have been shown and described, it is understood that the invention is not limited thereto, and is susceptible to numerous changes and modifications as known to those skilled in the art. Firstly, while the above-described embodiments relate to a front fork, they can easily be adapted to use in connection with a fork for a rear wheel. In this connection, for use on a rear fork (and in certain cases also for a front fork) it may be preferable to make the location sensitive flow control arrangement function in an opposite, regressive, manner to that described so as to start with the passage 25a being closed and then progressively open it, decreasing damping, as the strut is compressed.

Furthermore, it should be appreciated that, while the greatest advantage will follow from use of all of the inventive features described above, such is not a prerequisite. That is, the described location sensitive flow control arrangement can be used without the compression damping valve adjustment feature and vice versa. Likewise, the cartridge unit concept of the present invention can be used with either, neither or both of the noted location sensitive flow control and the compression damping valve adjustment features. Still further, while as noted initially, motor vehicle shock absorbing damping systems have not been adaptable to the needs of bicycles, those skilled in the art will recognize how the basic features of the present invention, such as the location sensitive flow control arrangement and the cartridge unit concept, while intended for a bicycle fork, will find direct applicability to shock absorbing motorcycle forks, as will the compression damping valve adjustment feature.

Therefore, this invention should not be viewed as being limited to the details shown and described herein. Instead, this invention includes all such changes and modifications as are encompassed by the scope of the appended claims.

We claim:

1. A shock absorbing fork for a two-wheeled vehicle of the type having a pair of telescoping struts, with upper tubes which are interconnected by an upper crown to a steerer tube at an upper end portion thereof and lower tubes which have means for mounting a wheel axle at a bottom end thereof; wherein a hydraulically damped shock absorbing arrangement is disposed within at least one of the telescoping struts, said shock absorbing arrangement having a piston with opposite first and second sides and a hydraulic fluid containing cylinder, upper and lower chambers being defined in said cylinder by said piston, a valve for regulating flow of hydraulic fluid along a first flow path through said piston between the upper and lower chambers, and said piston acting on said hydraulic fluid contained in the cylinder in a first direction upon compression of the telescopic struts; wherein a spring means for absorbing shocks is provided acting between the hydraulically damped shock absorbing arrangement and one of the tubes of the telescopic struts; wherein the hydraulically damped shock absorbing arrangement is provided with a location sensitive flow control arrangement having a second flow path extending between said opposite first and second sides of said piston and a flow adjusting element which is displaceable into and out of said second flow path; and wherein said spring means acts on said flow adjusting element when said piston acts on the hydraulic fluid in said first direction as a means for shifting the flow adjusting element by a distance that is a function of an extent to which said spring means is acted upon by compression of the telescopic struts, causing said flow adjusting element to act as a means for progressively changing flow through said second flow path as said struts are compressed and for progressively changing damping characteristics of the hydraulic damping arrangement in accordance with compression of the struts.

2. A shock absorbing fork according to claim 1, further comprising a piston rod connected to said piston; wherein said piston rod has an axial passage therein, and has a first end located outside of said cylinder; wherein said second flow path comprises a portion of the axial passage and a port in the piston rod, said port communicating said portion of the axial passage with one of said chambers; wherein the flow adjusting element comprises a displacement portion disposed between said first end of said piston rod and said spring means, and a flow adjusting shaft which extends into the axial passage of the piston rod into proximity with said port which communicates said portion of the axial passage with one of said chambers; resilient means for applying oppositely directed forces between said displacement portion of the flow adjusting element and said first end of the piston rod; wherein, upon compression of said struts, said flow adjusting shaft is displaced into said axial passage by said spring means against one of the forces exerted by said resilient means so as to progressively block flow through said port, and upon extension of said struts, said flow adjusting shaft being displaced out of said axial passage by said resilient means, progressively unblocking flow through said port.

3. A shock absorbing fork according to claim 2, wherein the piston rod is connected to said first side of the piston; wherein a second rod is connected to said piston at said second side of the piston, said second rod having a flow passage therein which communicates with the axial passage in said piston rod and forms part of said flow path second; wherein said port in the piston rod is a compression flow inlet port communicating with said upper chamber; and wherein said second rod is provided with a compression flow outlet port which communicates flow from said inlet port with said lower chamber.

4. A shock absorbing fork according to claim 3, wherein said resilient means is an annular pad of resiliently compressible material disposed around the flow adjusting shaft.

5. A shock absorbing fork according to claim 3, wherein said spring means is a coil spring.

6. A shock absorbing fork according to claim 3, wherein said hydraulically damped shock absorbing arrangement is formed as a self-contained replaceable cartridge unit removably disposed within said at least one of the telescoping struts, said cartridge unit comprising a cartridge body having end walls and a peripheral wall which enclose said piston and define said upper and lower chambers in conjunction with said piston; and wherein said piston rod extends through one of the end walls of said cartridge body.

7. A shock absorbing fork according to claim 3, said valve comprises at least one leaf spring disc mounted on said second side of the piston and overlying a plurality of passages through said piston, said passages having a flow through area which is progressively exposed as the spring disc is deflected away from the piston, commencing at a peripheral edge of the spring disc, due to pressure increases in said upper chamber due to compression of the struts; wherein an annular resilient pad is disposed overlying said spring disc; and wherein said second rod is a compression damping adjuster shaft having an axially adjustable abutment member thereon, said abutment member holding said resilient pad against the spring disc under a holding pressure which is adjustable by axial displacement of said abutment member.

8. A shock absorbing fork according to claim 7, wherein said hydraulically damped shock absorbing arrangement is formed as a self-contained replaceable cartridge unit, said cartridge unit comprising a cartridge body having end walls and a peripheral wall which enclose said piston and define said upper and lower chambers in conjunction with said piston; and wherein said piston rod extends through an end wall of said cartridge body and said adjuster shaft extends through one of the opposite end walls of said cartridge body.

9. A shock absorbing fork according to claim 7, wherein each of the upper and lower tubes has a lower end portion; wherein the second rod has an outer end and an inner end; wherein the outer end of the second rod is detachably fixed to the lower end of the lower tube of said telescoping strut and said cartridge body is detachably attached within the lower end portion of the upper tube of said telescoping strut.

10. A shock absorbing fork according to claim 7, wherein said axially adjustable abutment member comprises an annular holding disc mounted about the adjuster shaft; wherein a cross pin extends through an axially elongated diametral slot through the adjuster shaft; and wherein an adjustment rod is disposed in an axial passage through the adjuster shaft in an axially adjustable manner, said adjustment rod engaging said cross pin, whereby axial adjustment of the position of the adjustment rod relative to the adjuster shaft axially shifts the position of the cross pin in diametral slot to thereby cause the holding disc to compress the annular resilient pad to a greater or lesser extent.

11. A shock absorbing fork for a two-wheeled vehicle of the type having a pair of telescoping struts with upper tubes which are interconnected by an upper crown to a steerer tube at an upper end portion thereof and lower tubes which have means for mounting a wheel axle at a bottom end thereof; wherein a hydraulically damped shock absorbing arrangement is disposed within at least one of the telescoping struts, said shock absorbing arrangement having a piston with opposite first and second sides, a plurality of passages extending through said piston, and a hydraulic fluid containing cylinder, upper and lower chambers, being defined in said cylinder by said piston, a valve for regulating flow of hydraulic fluid along a first flow path through said piston between the upper and lower chambers, the first side of said piston acting on said fluid contained in the cylinder in a first direction upon compression of the telescopic struts; wherein said valve comprises at least one leaf spring disc mounted on said second side of the piston and overlying said plurality of passages through said piston, in a manner progressively increasing the total flow-through area of said passages as the spring disc is deflected away from the piston, commencing at a peripheral edge of the spring disc, due to pressure increases in said upper chamber due to compression of the struts; wherein an annular resilient pad is disposed overlying said spring disc; and wherein a compression damping adjuster shaft having an axially adjustable abutment member thereon is mounted to said second side of the piston, said abutment member holding said resilient pad against the spring disc under a holding pressure which is adjustable by axial displacement of said abutment member.

12. A shock absorbing fork according to claim 11, wherein said axially adjustable abutment member comprises an annular holding disc mounted about the adjuster shaft; wherein a cross pin extends through an axially elongated diametral slot through the adjuster shaft; and wherein an adjustment rod is disposed in an axial passage through the adjuster shaft in an axially adjustable manner, said adjustment rod engaging said cross pin, whereby axial adjustment of the position of the adjustment rod relative to the adjuster shaft axially shifts the position of the cross pin in diametral slot to thereby cause the holding disc to compress the annular resilient pad to a greater or lesser extent.

13. A shock absorbing fork according to claim 11, wherein said hydraulically damped shock absorbing arrangement is formed as a self-contained replaceable cartridge unit removably disposed within said at least one of the telescoping struts, said cartridge unit comprising a cartridge body having end walls and a peripheral wall which enclose said piston and define said upper and lower chambers in conjunction with said piston; and wherein said damping adjuster shaft extends through one of the end walls of said cartridge body.

14. A shock absorbing fork according to claim 13, wherein each of the upper and lower tubes has a lower portion; wherein the damping adjuster shaft has an outer end and an inner end; wherein the outer end of the damping adjuster shaft is detachably fixed to the lower end of the lower tube of said telescoping strut and said cartridge body is detachably attached within the lower end portion of the upper tube of said telescoping strut.

15. A shock absorbing fork for a two-wheeled vehicle of the type having a pair of telescoping struts with upper tubes which are interconnected by an upper crown to a steerer tube at an upper end portion thereof and lower tubes which have means for mounting a wheel axle at a bottom end thereof; wherein a hydraulically damped shock absorbing arrangement is disposed within at least one of the telescoping struts, said shock absorbing arrangement having a piston with opposite first and second sides and a hydraulic fluid containing cylinder, upper and lower chambers being defined in said cylinder by said piston, a valve for regulating flow of hydraulic fluid along a first flow path through said piston between the upper and lower chambers, and said piston acting on said hydraulic fluid contained in said cylinder in a first direction upon compression of the telescopic struts; and wherein said hydraulically damped shock absorbing arrangement is formed as a self-contained replaceable cartridge unit detachably mounted within said at least one of the telescoping struts, said cartridge unit comprising a cartridge body having end walls and a peripheral wall which enclose said piston and define said upper and lower chambers in conjunction with said piston, said piston rod extending through one of the end walls of said cartridge body.

16. A shock absorbing fork according to claim 15, comprising spring means for absorbing shocks, said spring means acting on the piston of the hydraulically damped shock absorbing arrangement in said first direction upon compression of the telescopic struts, and a location sensitive flow control arrangement having a flow path extending between said opposite first and second sides of said piston and a flow adjusting element which is displaceable into and out of said flow path; wherein said spring means acts on said flow adjusting element to shift it by a distance that is a function of an extent to which said spring means is acted upon in said first direction by compression of the telescopic struts, whereby flow through said flow path is progressively changed as said struts are compressed and damping characteristics of the hydraulically damped shock absorbing arrangement are progressively changed in correspondence therewith.

17. A shock absorbing fork according to claim 16, further comprising a piston rod connected to said piston; wherein said piston rod has an axial passage therein and has a first end located outside of said cylinder; wherein said second flow path comprises a portion of the axial passage and a port in the piston rod, said port communicating said portion of the axial passage with one of said chambers; wherein the flow adjusting element comprises a displacement portion disposed between said first end of said piston rod and said spring means, and a flow adjusting shaft which extends into the axial passage of the piston rod into proximity with said port which communicates said portion of the axial passage with one of said chambers; resilient means for applying oppositely directed forces between said displacement portion of the flow adjusting element and said first end of the piston rod; wherein, upon compression of said struts, said flow adjusting shaft is displaced into said axial passage by said spring means against force exerted by said resilient means so as to progressively block flow through said port, and upon extension of said struts, said flow adjusting shaft being displaced out of said axial passage by said resilient means, progressively unblocking flow through said port.

18. A shock absorbing fork according to claim 17, wherein said resilient means is an annular pad of resiliently compressible material disposed about the flow adjusting shaft.

19. A shock absorbing fork according to claim 17, wherein the piston rod is connected to said first side of the piston; wherein a second rod is connected to said piston at said second side of the piston, said second rod having a flow passage therein which communicates with the axial passage in said piston rod and forms part of said flow path; wherein said port in the piston rod is a compression flow inlet port communicating with said upper chamber; and wherein said second rod is provided with a compression flow outlet port which communicates flow from said inlet port with said lower chamber.

20. A shock absorbing fork according to claim 19, wherein each of the upper and lower tubes has a lower end portion; wherein the second rod has an outer end and an inner end; wherein the outer end of the second rod is detachably fixed to the lower tube of said telescoping strut and said cartridge body is detachably attached within the lower end portion of the upper tube of said telescoping strut.

* * * * *